3,291,446
TURBINE WHEEL
George J. Huebner, Jr., Bloomfield Hills, Mich., assignor to Chrysler Corporation, Highland Park, Mich., a corporation of Delaware
Filed Apr. 13, 1965, Ser. No. 447,656
10 Claims. (Cl. 253—77)

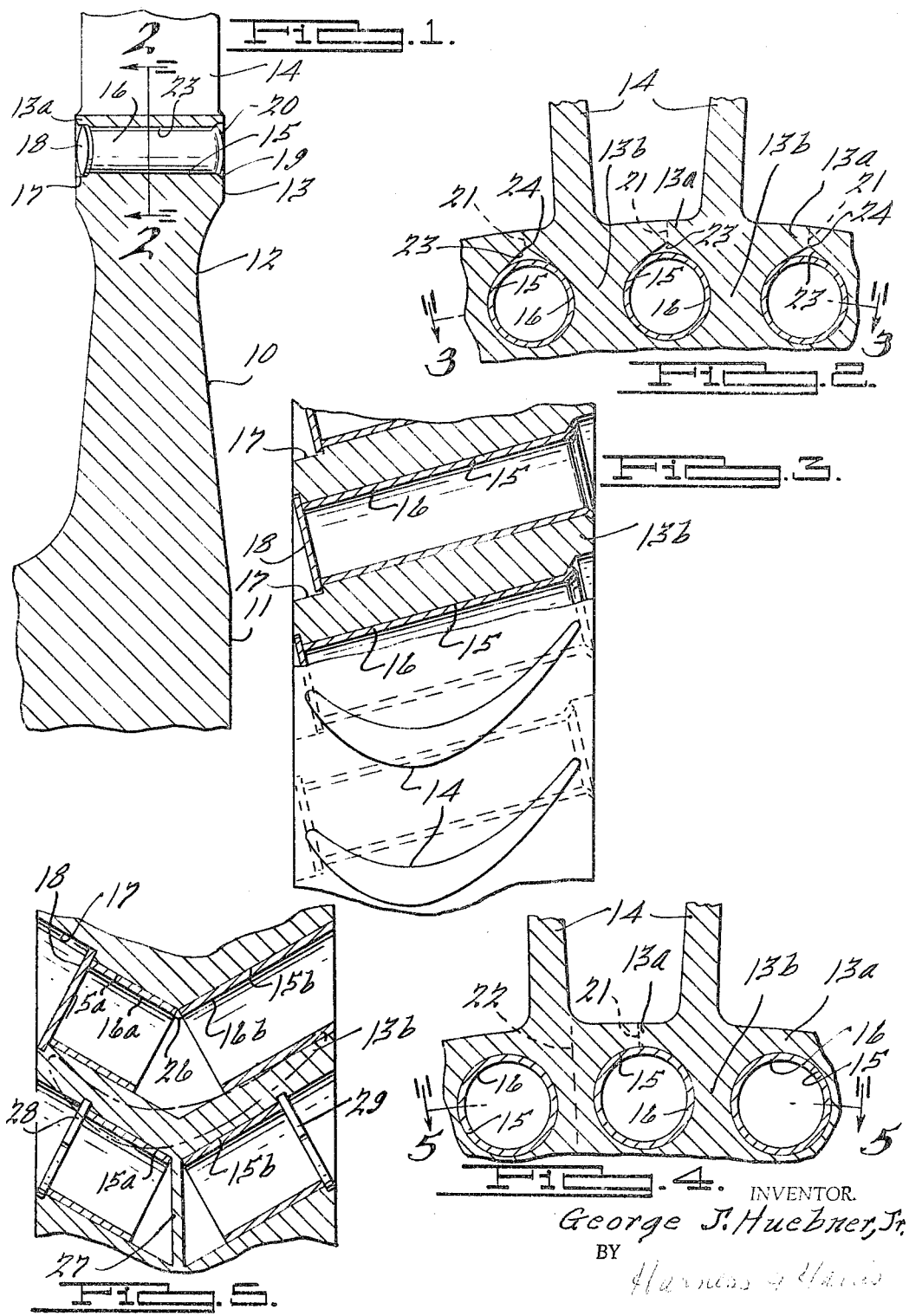

This invention relates generally to gas turbine engines and more particularly to a turbine wheel for use therein.

In the past, turbine wheels have been formed to provide a disc-like body having a rim and a plurality of radially directed circumferentially spaced blades formed on or secured to the rim. In some instances the disc body has also been provided with a hub for securing the wheel to a rotatable shaft.

In every application of a turbine wheel, an important consideration is the inertial characteristics of the wheel. In order to assure quick response by the wheel to the motive gases, precautions are normally taken to reduce the polar moment of inertia of the wheel. This usually is achieved by reducing the mass of the wheel particularly near its periphery.

In gas turbine engine applications, the turbine wheels experience various extreme stresses during normal engine operation, including mechanical stresses due to the centrifugal force resulting from high speed rotation, vibratory stresses particularly at the roots of the blades resulting from high frequency vibration of the blades induced by sonic velocities of the motive gases, and thermal stresses arising from exposure of the rim and blades to the relatively high temperature motive gases and to their comparatively extreme temperature variations between idling and maximum power conditions.

Because of these stresses, the mass of the turbine wheel, particularly near the rim, could not be effectively reduced to the degree desired in order to obtain a highly responsive turbine wheel. Heretofore, in order to prevent cracking of the turbine wheel, it has been considered necessary to increase the cross-sectional thickness of the rim and adjacent disc body. The cross-sectional thickness in such instances has in turn increased the general peripheral mass and inertia of the wheel, with consequent loss in wheel acceleration response. The increased cross-sectional thickness of the rim provides a comparatively rigid base for the blade roots, such that the blades have a high resonance vibration frequency which is attained when the wheel is under load near maximum conditions of temperature and angular velocity whereat the maximum vibratory forces on the blades, combined with near maximum centrifugal and thermal stresses on the rim, tend to crack the periphery of the wheel adjacent the blade roots.

Accordingly important objects of this invention are to provide a novel and improved turbine wheel which has a relatively low polar moment of inertia, which effectively minimizes the deleterious effects of cyclic thermal stresses normally arising from repeated exposure to hot motive gases, and which effectively reduces damaging vibratory stresses.

Another and more specific object is to provide such a turbine wheel comprising a disc-like body having a central hub and a peripheral rim, wherein the axially spaced sides of the body converge radially in the direction from the hub toward the rim and wherein the rim enlarges axially with respect to the adjacent portions of the wheel body to support a plurality of circumferentially spaced and radially extending blades. The rim is provided with axially spaced sides broken by cylindrical holes or bores extending generally axially through the rim, each hole having a diameter on the order of the circumferential spacing between the blades and being located circumferentially between a pair of successive blades. Each rim hole also contains a tightly fitting cylindrical tube or liner which carries a baffle to close the passage through the tube, thereby to prevent the motive gases from by-passing the rotor blades.

Another object is to provide such a rotor or turbine wheel wherein the diameter of each rim hole is appreciable with respect to the radial dimension of the rim, so that the amount of material removed by the hole and physical lightening of the rim and the reduction in its inertia are correspondingly appreciable, and also so that the stresses in the rim induced by centrifugal force, vibration of the rotor blades, and thermal expansion and contraction of the rim with respect to the disc body of the wheel are relieved.

Still another object is to employ tubular cylindrical liners for said holes tightly fitting therein, as for example by being pressed therein while in a shrunken condition, and formed of a material that will not vibrate readily in frequency with the surrounding mass of the rim as determined by the size of said holes therein, but will cooperate with the rim in dampening the amplitude and frequency of vibration of the rotor blades.

In accordance with the foregoing, not only is the inertia of the rotor wheel reduced and the effective length of the blades increased to reduce their vibration resonance frequency, but the liners reduce both the amplitude and the resonance frequency of the blade-rim system, presumably because of interference phenomena resulting from the natural vibration frequency of each liner and its interference fit within its aforesaid rim hole, whereby each liner stresses the surrounding rim material and is in turn subject to compressional forces exerted by the rim. Without limiting the present invention to any specific theory of operation, it is believed that this combined frictional and vibrational interaction between the rim and the liners is responsible for the desired reduced in amplitude and resonance frequency of the system, whereby resonance vibration of the blades occurs at comparatively low rotor speeds. At such speeds, the rim temperature as well as the centrifugal and thermally induced forces on the rim are comparatively low. On the other hand, the tensile strength of the rim material, which decreases with increasing temperature, is comparatively high. Thus vibration of the blades at their resonance frequency occurring at the comparatively low rotor speeds is unobjectional and causes no damage or cracking of the rim.

Also by reason of the comparatively large diameter of the rim holes, the outer peripheral portion of the rim over each hole and between consecutive blades, which is subject to the direct heat of the motive gases and to greater thermal expansion circumferentially than the portions of the rim radially inwardly of the holes, is freed to expand or bulge radially as the rim attains its operating temperature. The peripheral portion of the rim directly underlying each blade is constrained by the wheel structure against such radial enlargement, but is free for limited circumferential expansion as the aforesaid adjacent peripheral rim portions directly overlying the holes bulge radially. In consequence, the outer periphery of the rim is not subjected to the extreme circumferential compression at operating temperatures that would otherwise occur were it not for the holes in the rim, so that cracking of the rim upon subsequent cooling and shrinking of the rotor is minimized. If such cracking does occur, the crack will take place between a pair of successive blades at the location of the aforesaid bulge, which is subject to the most extreme cyclic deformation, rather than at the blade roots as heretofore in consequence of blade vibration at high resonance frequencies. Such a crack will not be particularly objectionable in a rim constructed as described and will tend to reduce further the resonance frequencies of the adjacent blades and to relieve the stress on the adjacent portions of the rim.

In addition, the rim holes of large diameter serve as a heat dam which increases the temperature gradient between the radially outer and radially inner portions of the rim 13. The later portion of the rim, operating at lower temperatures than would otherwise prevail, is subject to smaller thermally induced cyclic forces at the outset and also has greater tensile strength. Accordingly this radially inner portion of the rim can be of lighter weight construction than would otherwise be practical, with consequent decreased inertia and increased acceleration response.

Where the rotor wheel is operated under such conditions that substantial rim cracking is unavoidable, a further object of the invention is to provide channels of triangular cross-section opening radially inwardly into each of the rim holes or into selected rim holes. Each channel extends in parallelism with its associated hole and has a radially outwardly pointing apex defining a line of minimum strength extending from one axial side of the rim to the other. Thus cracking of the rim will be positively predetermined between the blades along the length of the apex of each channel.

Other objects and advantages of the invention will become apparent when reference is made to the following description and accompanying drawings wherein:

FIGURE 1 is a fragmentary sectional view taken along the axis of a gas turbine rotor wheel;

FIGURE 2 is a fragmentary enlarged sectional view taken in the direction of the arrows substantially along line 2—2 of FIGURE 1;

FIGURE 3 is a fragmentary sectional view taken in the direction of the arrows substantially along the arcuate line 3—3 of FIGURE 2;

FIGURE 4 is a view similar to FIGURE 2, showing a modification; and

FIGURE 5 is a fragmentary view taken in the direction of the arrows substantially along the line 5—5 of FIGURE 4.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, a specific embodiment of the present invention is illustrated by way of example in a rotor wheel 10 for a gas turbine engine having an enlarged or axially thickened hub 11 adapted to be splined coaxially to a rotatable shaft to drive the same. From the hub 11 the body of the wheel 10 converges radially outwardly to a restricted neck 12, so as to minimize the rotational inertia of the wheel by reducing its weight at the region where the resultant of the centrifugal and cyclic forces on the wheel are the least. Radially outwardly from the neck 12 the wheel enlarges axially to a peripheral rim 13 which may comprise an integral portion of the body 10, or the rim 13 may comprise a separate material highly resistant to the temperature of the motive gases and to the cyclic forces acting on the rim. Extending radially outwardly from the rim 13 are a plurality of integral blades 14. The structure thus far may be conventional and is preferably formed by casting operations.

Extending generally axially through the rim 13 are a plurality of holes 15. The latter may be cast or bored so as to extend from one axial side of the rim to the other generally in parallelism with the cords of the adjacent blades 14, FIGURE 3, one such hole 15 being formed in the rim 13 between each pair of consecutive blades 14, such that the major portion of each blade 14 overlies and is supported by a solid portion 13b of the rim between successive holes 15. In this regard the diameter of the holes 15 is as large as possible without decreasing the circumferential dimension of the rim portion 13b to the extent that support for the blades 14 is impaired. Since the rim 13 and blades 14 are cast as an integral structure from the same temperature resistant material, the thickness or circumferential dimension of each portion 13b will be of the order of magnitude of the blade thickness, and correspondingly, the diameter of each hole 15 will be on the order of magnitude of the spacing between successive blades 14.

Within each hole 15 is a tubular sleeve or liner 16 which extends from adjacent one axial side of the rim to the other. Each liner 16 is formed from hard, load sustaining, high temperature resistant material, similar to the material of the rim 13 and blades 14, and may in fact be formed of the identical material, or of similar material having different physical properties, such as a different modulus of elasticity or coefficient of thermal expansion which will be determined for reasons that will be apparent herein. The liners 16 are forced into the holes 15 under considerable pressure to effect an interference fit during operation of the wheel 10 at maximum load and temperature conditions. Under such conditions, each liner will be subject to compressional forces by the surrounding material of the rim 13, and the latter will be stressed correspondingly. In the usual instance, the liners 16 are preshrunk by refrigeration and are then forced into the holes 15 while the rim 13 is hot and the holes are expanded, so as to effect the desired interference fit between the liners 16 and rim 13 during maximum temperature operating conditions.

At the high pressure side of the wheel 10, each of the holes 15 is enlarged at 17 to provide an annular shoulder against which is seated an end closure baffle comprising a disc 18 welded to the adjacent end of the liner 16. By virtue of the liner 16 and baffle 18, the associated hole 15 is closed to prevent bypassing of the blades 14 by the motive gases. The axially opposite end of each hole 15 is enlarged at 19 to receive a flared end 20 of the liner 16 and securely lock the latter in place with respect to the rim 13.

One of the significant economies of the gas turbine engine results from the fact that the motive gases which impinge upon the blades 14 and rotate the wheel 10 are at as high a temperature as the wheel structure will stand. Thus the blades are operated at white heat temperatures by motive gases flowing at sonic velocities, such that cracking of the rim 13 is a serious problem that has not been completely avoided heretofore. For example, without the provision of the holes 15, the motive gases passing axially between the blades 14 at approximately sonic velocities tend to induce vibration in the blades at a resonance frequency which frequently causes the rim 13 to crack at the blade roots where the blades 14 join the outer periphery of the rim 13. The support for the blade 14 is thus weakened and the blade or portions of the rim are thrown out by centrifugal force.

Also when the rim 13 approaches its maximum operating temperature, it tends to expand radially outwardly. Without the holes 15, this tendency to expand is resisted by the radially inner portions of the body of the wheel 10. In consequence of being restrained against radial enlargement, the thermal forces tending to expand the rim subject the latter to extreme circumferential compressional forces which in the usual instance exceed the elastic limit of the material of the rim 13. Thereafter when the rotor cools and the rim tends to shrink, the weakened rim tends to crack radially and assist the vibrationally induced cracking during subsequent operation.

By virtue of the holes 15, the weight of the rim 13 is materially reduced, so that the wheel 10 has a quicker operating response to the motive gases. Also, the peripheral portions 13a of the rim 13 overlying the holes 15 are free to bulge radially outwardly in consequence of the thermally induced forces tending to expand the rim. The outer peripheral portions of the rim 13 between the holes 15 are restrained against radial enlargement as before, but are now free to expand circumferentially by reason of the bulge of the portions 13a. Alternate cooling and heating of the rim during operation may cause cracking, but such cracks if they occur will take place in FIGURE 4 substantially at the midpoint of the rim portion 13a, as indicated by the broken line 21, which is the weakest point of the rim 13 and which is also subject to the maximum cyclic deformation.

The holes 15 also reduce the rigidity of the blade support and in effect increase the radial length of the blades by a distance approximately equal to the dotted line 22, FIGURE 4. In consequence, the resonance vibration frequency of the blade 14 is materially reduced, such that resonance vibration is encountered only at relatively low operating temperatures and speeds. During operation at low temperature conditions, the strength of the rim 13 and blades 14 is substantially greater and the vibrational energy of the blade-rim system is considerably smaller than at normal or maximum temperatures and speeds, such that cracking of the rim 13 does not occur.

A further control over the blade vibration and damping thereof is effected by the sleeve liners 16 which act as mechanical or frictional dampers to vibration in the surrounding rim material. The vibration characteristic of the blades 14 and rim 13 complex is accordingly predetermined by properly locating the holes 15 and suitably predetermining their diameters and also by predetermining the elasticity and thickness of the liners 16 and the stress effected thereby in the rim 13. The holes 15 need not be circular in cross-section but their radially inner portions are preferably flat or rounded in order to prevent any extension of a crack at 21 radially inwardly of the hole 15.

Where the rotor wheel 10 is operated under conditions that render cracking of the rim unavoidable, a channel 23 of triangular cross-section is provided in parallelism with each hole 15, FIGURE 2. Each channel 23 opens radially inwardly into the associated hole 15 and has sides of equal length converging to an apex 24 in radial alignment with the center of the associated hole 15. The apex 24 points radially outward from the hole 15 and sharply defines a region of minimum strength for the rim portion 13a between successive blades 14, such that cracking of the rim 13 occurs radially from each apex 24 substantially along the dotted line 21.

FIGURE 5 illustrates another modification of the present invention wherein the holes 15 are formed with dog-leg portions 15a and 15b, so that the rim portion 13b between successive holes 15 conforms more closely to the contour of the associated blade 14. In other respects, the structure of FIGURE 5 operates in the manner described above. Inasmuch as the holes 15a, 15b in FIGURE 5 closely follow the contour of the adjacent blades 14, the rim portion 13b in FIGURES 4 and 5 is more effective in supporting the overlying blade 14 and may accordingly be reduced in circumferential thickness. Thus, the holes 15 in FIGURES 4 and 5 may be of slightly greater diameter than the corresponding holes of FIGURE 2, such that the weight and inertia of the rim 13 is reduced still further and the frequency of vibration of the blade 14 is decreased.

Within each of the holes 15a and 15b is a corresponding tubular liner 16a and 16b of a liner assembly 16 corresponding in function to the liner 16 of FIGURE 2. If desired, the adjacent inner ends of the liners 16a and 16b may be butt welded together as at 26 to prevent their separation from the rim 13 during operation. In this case, the high pressure end of hole 15a may be closed by an end closure disc 18 welded to the liner 16a to prevent bypassing of the blade 14 by the motive gases. Also if desired, the holes 15a and 15b may be spaced by a web 27 comprising an integral portion of the rim 13, FIGURE 5. In this event, the end closure disc 18 need not be employed. In order to hold the liners 16a and 16b in place, C-ring retainers 28 and 29 may be recessed into the material of the rim 13 at the opposite outer ends of the liners 16a and 16b. Although two types of structures are illustrated in FIGURE 5, in the usual instance only one such structure will be employed for all of the sleeve assemblies 16.

I claim:

1. In a rotor for a gas turbine engine, a disc body, an axially enlarged rim defining the periphery of said body, means operable by hot motive gases at sonic velocities for rotating said rotor comprising a plurality of circumferentially spaced blades comprising a unitary structure with said rim and extending radially therefrom, said blades terminating radially outwardly in free standing ends, means for relieving cyclic stresses in said rim and for facilitating thermal expansion and contraction of the radially outer portions of said rim between said blades and also for reducing the vibration frequency of said blades comprising a plurality of circumferentially spaced holes extending generally axially in said rim at locations between said blades and radially inwardly of said radially outer portions, the circumferential dimension of each hole being on the order of magnitude of the circumferential spacing between said blades, and the minimum circumferential dimension of said rim between successive holes being on the order of magnitude of the maximum circumferential thickness of each blade, means for preventing the passage of gases axially through said rim at said holes, and means for damping the amplitude of vibration of said blades and the portions of said rim adjacent said holes comprising a separate tubular insert tightly fitting within each hole, said rim engaging the inserts force tending to compress the latter during all normal operating conditions of said rotor.

2. In the combination according to claim 1, said holes being cylindrical and the axis of each hole being approximately parallel to the blade chords adjacent the bases of the proximate blades.

3. In the combination according to claim 1, said holes being circularly cylindrical and extending completely through said rim in directions approximately parallel to the blade chords adjacent the bases of the proximate blades, the diameter of each hole being on the order of magnitude of the circumferential spacing between successive blades.

4. In the combination according to claim 3, one of said holes being provided in said rim between each pair of consecutive blades, and the minimum radial thickness of said radially outer portions being of the same order of magnitude as the minimum circumferential dimension of said rim between successive holes and the maximum circumferential thickness of each blade.

5. In the combination according to claim 1, one of said holes being provided in said rim between each pair of consecutive blades.

6. In the combination according to claim 5, each of said holes being paired with another of said holes and spaced therefrom by a portion of said rim radially underlying one of said blades, each hole comprising two parts extending angularly into said rim from the axially opposite faces thereof such that the latter portion of said rim underlies and conforms to the contour of the center of mass of the radially overlying blade at the latter's juncture with said rim.

7. In the combination according to claim 1, the radially outer portions of certain of said holes converging radially outwardly to an apex to define predetermined crack locating regions for said rim.

8. In the combination according to claim 1, each of said holes being paired with another of said holes and spaced therefrom by a portion of said rim radially underlying one of said blades, each hole comprising two parts extending angularly into said rim from the axially opposite faces thereof such that the latter portion of said rim underlies and conforms to the contour of the center of mass of the radially overlying blade at the latter's juncture with said rim.

9. In a rotor wheel for a gas turbine engine, a disc body, an axially enlarged rim defining the periphery of said body, a plurality of circumferentially spaced blades carried by said rim and extending radially therefrom, means for relieving cyclic stresses in said rim and for facilitating thermal expansion and contraction of the radially outer portions of said rim throughout the axial extent thereof and also for substantially reducing the vibration rate of said blades comprising a plurality of circumferentially spaced cylindrical holes in said rim extending completely therethrough from one axial side thereof to the other at locations inwardly of said radially outer portions, the diameter of each hole being on the order of the magnitude of the circumferential spacing between said blades, an axially extending channel associated with certain of said holes and formed in said rim adjacent and parallel to the radially outer portion of the associated hole to define a predetermined crack locating region for said rim, each channel being generally triangular in the cross section normal to the axis of the associated hole, the base of each channel comprising the apex of a triangle pointing radially outwardly of the mouth of each channel opening radially inwardly into the associated hole, and each channel being located circumferentially between a pair of consecutive blades.

10. In the combination according to claim 9, means for damping the vibration of said blades and the portions of said rim adjacent said holes comprising a separate tubular insert snugly fitted within each hole and extending substantially the axial length thereof, a baffle carried by each insert to block axial passage of gases therethrough, the end of each hole associated with one of said channels being enlarged at the high pressure side of said wheel to provide a shoulder extending transversely to the axis of the hole to adjacent the apex at the base of the associated channel and being intersected by said channel, said baffle for each hole associated with one of said channels comprising an end closure plate for the tubular insert within the hole, each plate extending transversely of the axis of its tubular insert beyond the circumference of the associated hole and abutting said shoulder to close the end of the associated channel intersecting said shoulder.

References Cited by the Examiner
UNITED STATES PATENTS

| 2,326,145 | 8/1943 | Kroon | 253—77 |
|---|---|---|---|
| 2,595,829 | 5/1952 | Dean. | |
| 2,651,494 | 9/1953 | Persson | 253—77 |
| 2,656,146 | 10/1953 | Sollinger. | |
| 2,667,327 | 1/1954 | Hardigg | 253—77 |
| 2,753,149 | 7/1956 | Kurti | 253—77 |
| 2,819,869 | 1/1958 | Meyer | 253—77 |

FOREIGN PATENTS 918,326   9/1954   Germany.

MARTIN P. SCHWADRON, *Primary Examiner.*

EVERETTE A. POWELL, *Examiner.*